United States Patent [19]
Kojima et al.

[11] Patent Number: 5,331,653
[45] Date of Patent: Jul. 19, 1994

[54] SOLID-STATE LASER DEVICE

[75] Inventors: Minoru Kojima; Mitsugu Terada, both of Sodegaura; Kazuyoshi Sutoh, Noda, all of Japan

[73] Assignee: Mitsui Petrochemical Industries, Ltd., Tokyo, Japan

[21] Appl. No.: 975,947

[22] PCT Filed: Jul. 1, 1992

[86] PCT No.: PCT/JP92/00828
§ 371 Date: Feb. 25, 1993
§ 102(e) Date: Feb. 25, 1993

[87] PCT Pub. No.: WO93/01636
PCT Pub. Date: Jan. 21, 1993

[30] Foreign Application Priority Data
Jul. 1, 1991 [JP] Japan .................. 3-160684
Jul. 1, 1991 [JP] Japan .................. 3-160685

[51] Int. Cl.$^5$ .................................... H01S 3/04
[52] U.S. Cl. .............................. 372/35; 372/72
[58] Field of Search ........................ 372/35, 70, 72

[56] References Cited

U.S. PATENT DOCUMENTS 3,493,888  2/1970  Jackson .................... 372/35
5,130,999  7/1992  Maeda et al. ............ 372/35

FOREIGN PATENT DOCUMENTS 0427856  5/1991  European Pat. Off. .
0431619  6/1991  European Pat. Off. .
1192774  5/1970  United Kingdom .

OTHER PUBLICATIONS

Review of Scientific Instruments vol. 51, No. 9, Sep. 1980, N.Y., pp. 1194–1197 D. Gettemy et al., 'Liquid Nitrogen Cooled Laser Rod . . . '.

Primary Examiner—James W. Davie
Attorney, Agent, or Firm—Sherman and Shalloway

[57] ABSTRACT

An object of the invention is to provide a solid state laser device design so as to improve a cooling effect in said laser device; whereby an electric power to be applied to an excitation lamp can be increased, a large oscillation power can be obtained, and a thermal lens effect generated in the laser medium can be suppressed. The solid-state laser device includes a laser medium, an excitation lamp for applying excitation light to the laser medium, a transparent first cooling pipe accommodating the laser medium, a transparent second cooling pipe accommodating the excitation lamp, wherein a first cooling system which feeds a cooling water to the first cooling pipe and a second cooling system which feeds a cooling water to the second cooling pipe are independent of each other and the respective systems have a water-feeding pump. The cooling pipes are formed of cerium-doped quartz glass capable of inhibiting transmission of light having a wavelength not longer than 320 nm.

6 Claims, 9 Drawing Sheets

Wavelength (nm)

FIG.5

Wavelength (nm)

SOLID-STATE LASER DEVICE

TECHNICAL FIELD

The present invention relates to a solid-state laser device, and more particularly to a solid-state laser device provided with cooling pipes for cooling a laser medium and an excitation lamp.

BACKGROUND OF THE INVENTION

Figure 10:
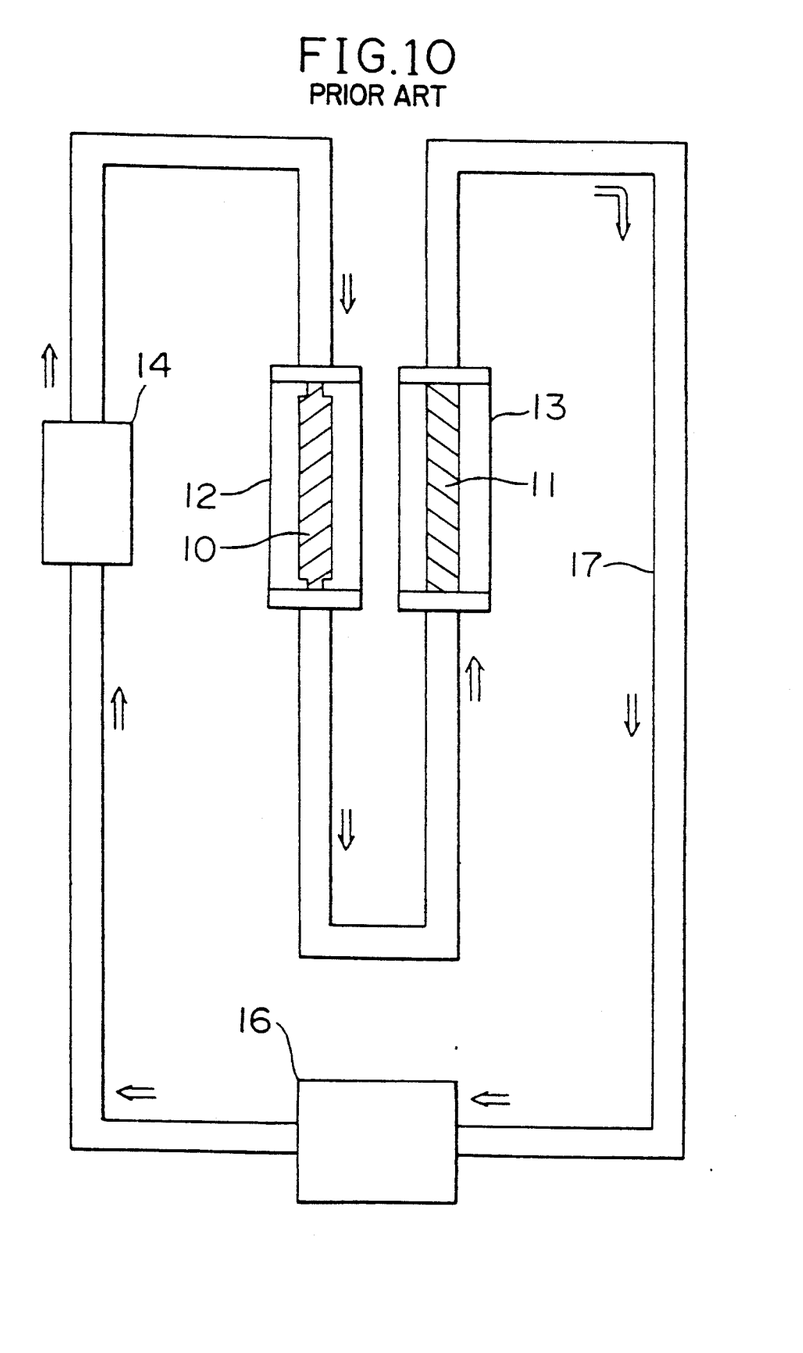
FIG. 10 is a block illustration of a cooling system for a solid-state laser device in the prior art.

A cooling system for cooling a laser medium of a solid-state laser device and an excitation lamp for applying excitation light to the laser medium in the prior art comprising, as shown in FIG. 10, a laser medium 10 accommodated in a transparent first cooling pipe 12, and an excitation lamp 11 is accommodated in a transparent second cooling pipe 13. Said two cooling pipes are communicated with each other through a communication pipe 17 for circulating a cooling water to the cooling pipes and the communication pipe.

However, the above-mentioned solid-state laser device comprises each laser medium and each excitation lamp accommodated in the respective cooling pipes through which the communication pipe is communicated and into which the cooling water is feeded by the pump, and a flow passage in each cooling pipe is narrow, and there are present any projections in the flow passage, so that a pressure loss of the cooling water becomes large. As a result, a flow rate of the cooling water in each cooling pipe is reduced, and accordingly it is difficult to obtain a sufficient cooling effect in each cooling pipe. Thus, a limited electric power to be applied to the excitation lamp is suppressed to reduce a laser power from the laser medium.

If a large electric power greater than the limited electric power is applied to the excitation lamp, there is a possibility that the laser medium will be broken.

Generally, the solid state laser device provided with the laser medium and the excitation lamp for applying excitation light thereto, as mentioned above, prevents heat accumulation in the laser medium and the excitation lamp due to optical pumping by accommodating the laser medium in the transparent first cooling pipe and accommodating the excitation lamp in the transparent second cooling pipe to thereby cool the laser medium and the excitation lamp with the cooling water.

If the laser medium is heated, a laser beam will be expanded by a thermal lens effect to cause a reduction in laser power. If the laser medium is further heated, there is a possibility that the laser medium will be broken.

In Japanese Utility Model Laid-open Publication No. 57-175452, there is disclosed a technique such that an adverse wavelength light-absorbing material is sealed in a space of a double pipe surrounding a laser rod. However, this technique has a possibility of aged deterioration of the adverse light-absorbing material.

In Japanese Utility Model Laid-open Publication No. 58-11268, there is disclosed a solid-state laser oscillation device, wherein as laser rod side and an excitation lamp side are partitioned each other, having a laser head formed with two water passages for individually cooling the laser rod and the excitation lamp, and a pair of pure water circulating units individually connected to the two water passages. Each pure water circulating unit includes a water temperature control device and a water tank. A water temperature of a pure water to be circulated in the water passage for the laser rod is maintained at a temperature higher than ordinary temperature, which water temperature is higher than a water temperature of a pure water to be circulated in the water passage for the excitation lamp. Thus, the water tanks must be individually provided in the pure water circulating units.

DISCLOSURE OF THE INVENTION

It is an object of the present invention to improve a cooling efficiency so as to increase a limited electric power to be applied to an excitation lamp and thereby increase a laser oscillation power.

According to the present invention, there is provided a solid-state laser device comprising a laser medium, an excitation lamp for applying an excitation light to said laser medium, a transparent first cooling pipe accommodating said laser medium, a transparent second cooling pipe accommodating said excitation lamp, wherein a first cooling system which feeds a cooling water to said first cooling pipe and a second cooling system which feeds a cooling water to said second cooling pipe are independent of each other and the respective systems have a water-feeding pump.

In the present invention, it is preferable that a flow rate of said cooling water in said first cooling system is maintained at 30 liters/min or more, and a flow rate of said cooling water in said second cooling system is maintained at 60 liters/min or more. Further, a control device for controlling the above flow rates may be provided. For instance, first and second temperature sensors may be provided on or in the first and second cooling pipes, respectively, and the first and second pumps in the first and second cooling systems may be controlled according to temperatures detected by the first and second temperature sensors, respectively.

According to the present invention, the first cooling pipe and the second cooling pipe are independent of each other and the respective pipes have a water-feeding pump. Accordingly, a pressure of the cooling water to be fed to each cooling pipe can be increased, so that even when a pressure loss occurs in each cooling pipe, a sufficient water pressure or flow rate can be maintained. As a result, the laser medium and the excitation lamp can be efficiently cooled, and accordingly the limited electric power to be applied to the excitation lamp can be increased to thereby increase a laser oscillation power.

It is another object of the present invention to provide a solid-state laser device which can reduce irradiation of undue light to the laser medium for optical pumping to suppress thermal influence on the laser medium and thereby reduce a thermal lens effect, thus obtaining stable laser oscillation.

According to the present invention, there is provided a solid-state laser device comprising a laser medium, an excitation lamp for applying excitation light to said laser medium, a transparent first cooling pipe accommodating said laser medium, and a transparent second cooling pipe accommodating said excitation lamp, said device being designed to feed a cooling water to said cooling pipes, wherein at least one (preferably, both) of said first cooling pipe and said second cooling pipe is formed of cerium-doped quartz glass capable of inhibiting transmission of light having a wavelength not longer than 320 nm.

Figure 9:
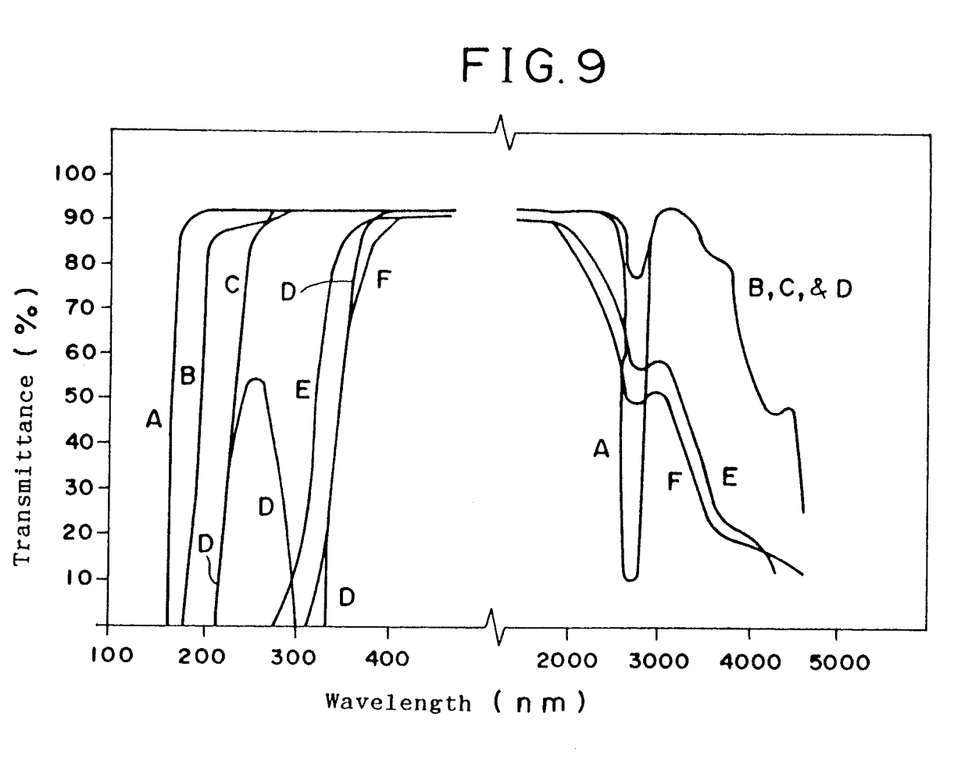
FIG. 9 is a graph showing light transmittances of various materials for the cooling pipes in the prior art.

FIG. 9 shows light transmittances of various materials for a cooling pipe having a thickness of 1 mm, in which the curves A, B, C, D, E and F represent (A) synthetic quartz glass, (B) natural quartz glass, (C) titanium doped natural quartz glass, (D) cerium-doped natural quartz glass, (E) Pyrex glass and (F) Nonex glass. These materials are capable of transmitting a light having a wavelength ranging from about 200 to 3500 nm so as not to hinder the transmission of an excitation light from the excitation lamp. A cooling water is fed to the cooling pipes, so as to cool the laser medium and the excitation lamp and thereby prevent thermal influence on the laser medium and the excitation lamp.

However, even by cooling the laser medium etc with the use of the cooling water, it is difficult to completely eliminate the thermal influence on the laser medium. The above materials for the cooling pipe transmit even a light having a wavelength to be less absorbed by the laser medium. For example, as apparent from FIG. 9, a cooling pipe made of synthetic quartz glass (A), natural quartz glass (B), titanium doped natural quartz glass (C) or cerium-doped natural quartz glass (D) transmits an ultraviolet light having a wavelength ranging from about 100 to 300 nm. This ultraviolet light does not contribute to laser oscillation, but becomes thermal energy. If the thermal energy is accumulated, a thermal lens effect is generated in the laser medium.

Figure 8:
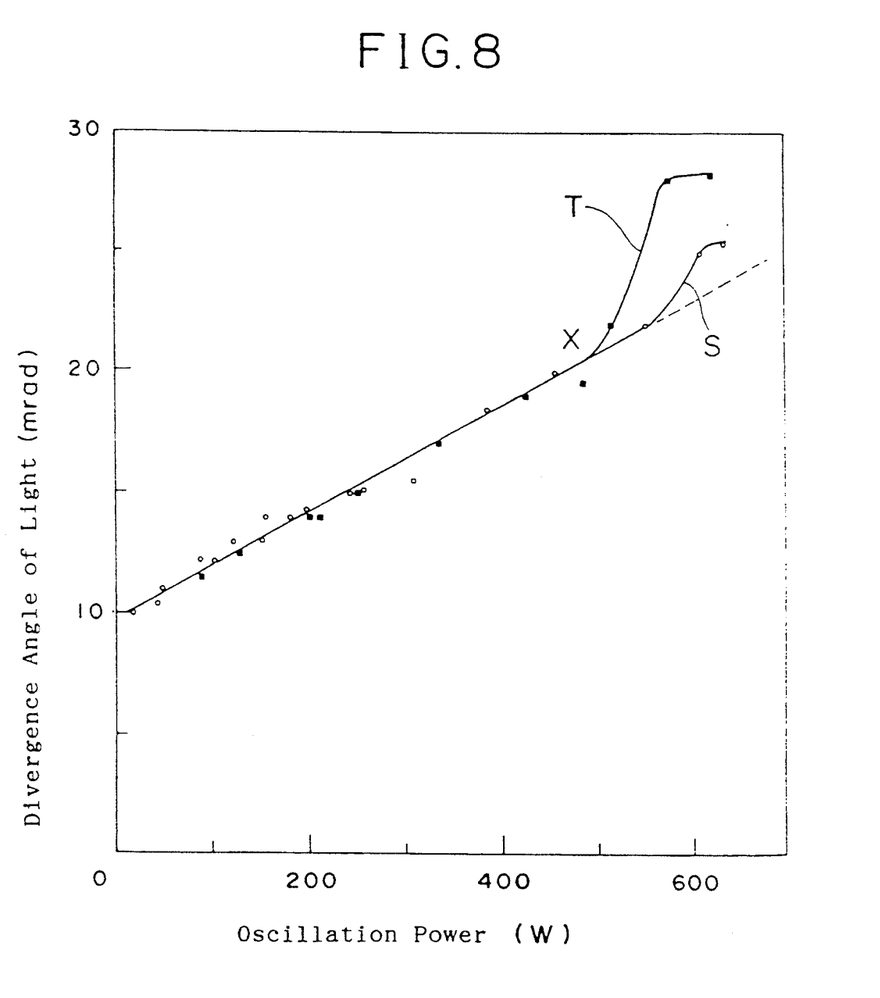
FIG. 8 is a graph showing a relation between an oscillation power and a divergence angle of light due to a thermal lens effect.

Referring to FIG. 8, the curve T shows a relation between an oscillation power and a divergence angle of a laser beam in using natural quartz glass as the material for the cooling pipes. As apparent from FIG. 8, the divergence angle is rapidly increased by a thermal lens effect at a point X corresponding to an oscillation power of about 500 W. Accordingly, even when an electric power to be applied to the excitation lamp is increased, it becomes a problem that the oscillation power lowers.

In the present invention, the use of the cerium doped quartz glass as the material for the cooling pipe causes to inhibit the transmission of a light having a wavelength not longer than 320 nm in applying the excitation light from the excitation lamp to the laser medium, thereby suppressing the thermal influence on the laser medium. As a result, when the electric power to the excitation lamp is increased, the reduction of the oscillation power can be suppressed.

According to the present invention, there is provided a solid-state laser device comprising a laser medium, an excitation lamp for applying excitation light to said laser medium, a transparent first cooling pipe accommodating said laser medium, and a transparent second cooling pipe accommodating said excitation lamp, said device being designed to feed a cooling water to said cooling pipes, wherein at least one (preferably, both) of said first cooling pipe and said second cooling pipe is formed of cerium-doped quartz glass capable of inhibiting transmission of light having a wavelength not longer than 320 nm, and wherein a first cooling system which feeds a cooling water to said first cooling pipe and a second cooling system which feeds a cooling water to said second cooling pipe are independent of each other and the respective cooling system have a water-feeding pump. With this construction, the cooling effect can be improved and the thermal lens effect can be suppressed. As a result, a sufficiently large electric power can be applied to the excitation lamp without breakage of the laser medium, and a large oscillation power can be obtained.

Further, the laser medium to be used in the present invention may be formed of any suitable material such as Nd: YAG, YAG, Nd glass, titanium added sapphire, alexandrite, ruby, glass, etc.

BEST MODE FOR CARRYING OUT THE INVENTION

Referring now to the accompanying drawings, the present invention is described.

Embodiment 1

Figure 1:
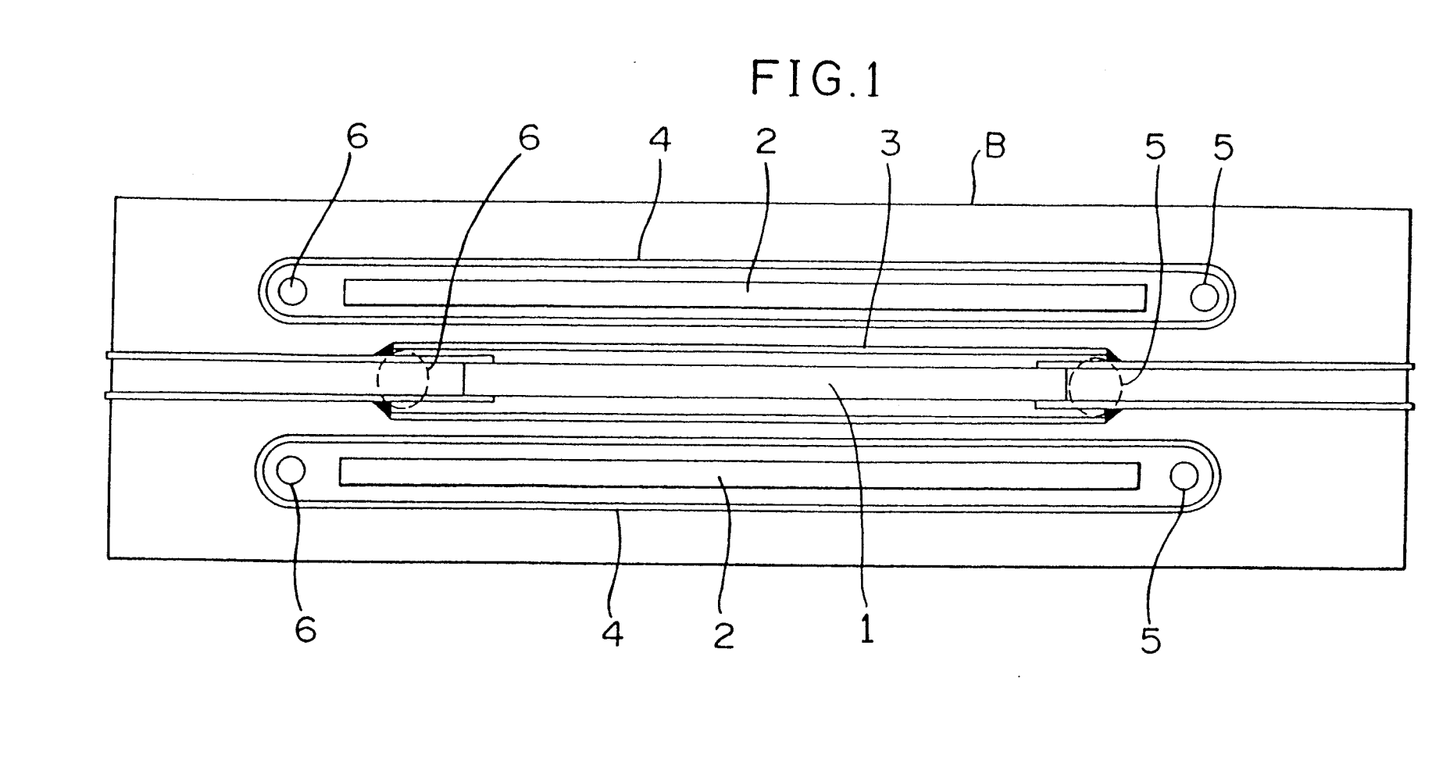
FIG. 1 is a sectional view of a first embodiment of the present invention.
Figure 2:
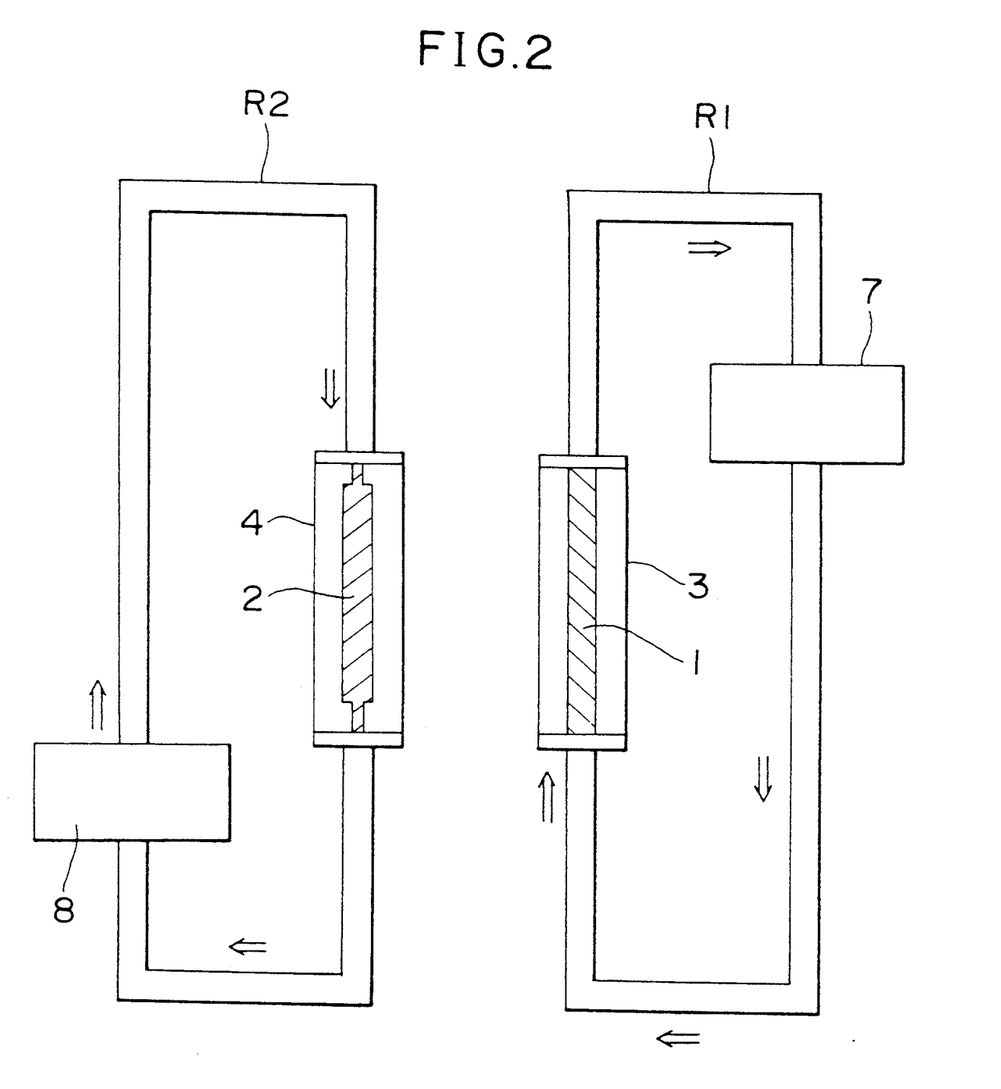
FIG. 2 is a block illustration of cooling systems according to the present invention.

FIG. 1 is a sectional view of the cooling portion of the solid-state laser device according to the present invention, and FIG. 2 is a block illustration showing the constitution of said cooling portion.

Referring to FIG. 1, the laser device in this Embodiment comprising a laser resonator body B provided therein with a laser medium 1 and excitation lamps 2.

The laser medium 1 used is formed of neodymium added yttrium-aluminum-garnet (Nd:YAG) and accommodated in a first cooling pipe 3. The first cooling pipe 3 is formed of transparent quartz glass (cerium-doped quartz glass capable of inhibiting transmission of a light having a wavelength not longer than 320 nm).

The two excitation lamps 2 as an excitation light source are so located as to interpose the laser medium 1 therebetween. Each excitation lamp 2 is also accommodated in a second cooling pipe 4 formed of transparent quartz glass (cerium doped quartz glass capable of inhibiting transmission of a light having a wavelength not longer than 320 nm).

The first cooling pipe 3 is formed at its both ends with a cooling water inlet 5 and a cooling water outlet 6. As shown in FIG. 2, a first cooling system R1 for circulating a cooling water to the first cooling pipe 3 and a second cooling system R2 for circulating a cooling water to the second cooling pipe 4 are provided independently of each other.

Each cooling system has a communication pipe for circulating a cooling water. The communication pipe of the first cooling system R1 is provided with a first radiator pump 7 for cooling again the cooling water discharged from the first cooling pipe 3 to a set temperature and for pumping the cooling water thus cooled.

The communication pipe of the second cooling system R2 is provided with a second radiator pump 8 for cooling again the cooling water discharged from the second cooling pipes 4 to a set temperature and for pumping the cooling water thus cooled.

A pure water, as the cooling water, is filled in the cooling pipes and the communication pipes. Each cooling water is circulated by the radiator pumps 7 and 8 in a direction shown by an arrow in FIG. 2.

The flow rate of the cooling water in the first cooling system R1 is maintained at 40 liters/min, and the flow rate of the cooling water in the second cooling system R2 is maintained at 70 liters/min.

Cooling water passages in the first cooling pipe 3 and the second cooling pipes 4 are narrow, and in some case, a holder for holding the laser medium 1 or the excitation lamp 2 projects into the cooling water passages. Accordingly, a water pressure loss of the cooling water is large.

To cope with this, according to the first embodiment, each of the communication pipes has a reduced length, and each of the radiator pumps has an increased pumping pressure. Accordingly, a sufficient water pressure of the cooling water can be maintained even after the pressure loss. That is, a sufficient flow rate of in the cooling water can be maintained to thereby improve a cooling efficiency for the laser medium 1 and the excitation lamp 2. Furthermore, the above-mentioned specified cerium-doped quartz glass the generation of thermal energy can be suppressed to thereby prevent the generation of a thermal lens effect. As a result, an electric power of 30 KW or more can be applied to, and an oscillation power of 800 W or more can be obtained.

As materials for the first and second cooling pipes, there are used any suitable material transparent in a wavelength region of excitation light, such as Nd:YAG, alexandrite, etc., for example, synthetic quartz glass, natural quartz glass, cerium doped natural quartz glass, titanium doped natural quartz glass, Pyrex glass, Sm filter, etc.

While Nd:YAG is used as the material for the laser medium 1, the laser medium 1 may be formed of any suitable material such as Nd-YAG, YAG, Nd:glass, titanium-added sapphire, alexandrite, ruby, glass, etc.

Embodiment 2

A second embodiment of the present invention is described based on FIGS. 3 to 9.

Figure 3:
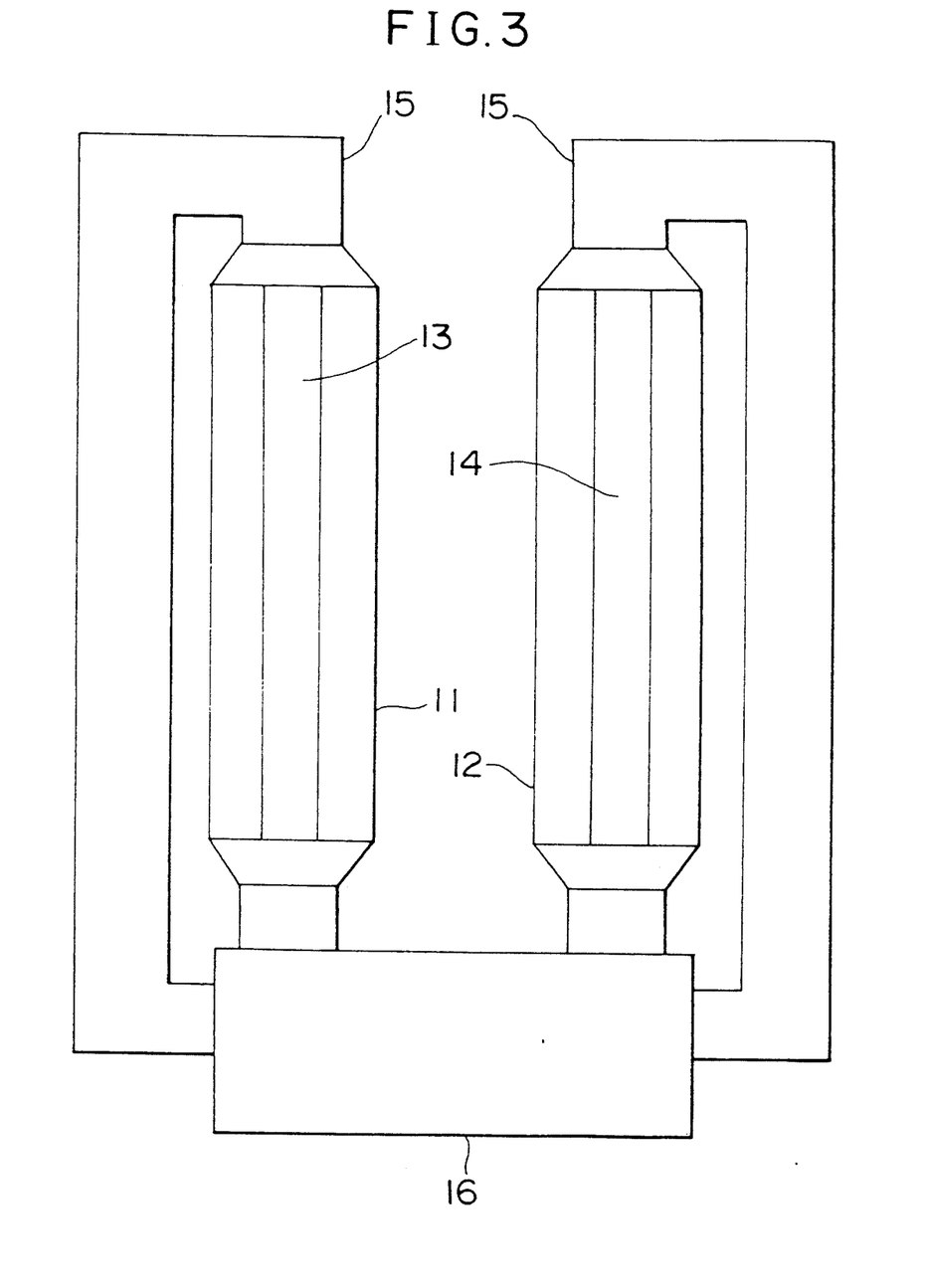
FIG. 3 is a schematic illustration of a second embodiment of the present invention.

FIG. 3 shows a second embodiment of the present invention, in which a first cooling pipe 11 and a second cooling pipe 12 are used, which pipes are formed of cerium-doped quartz glass capable of inhibiting transmission of a light having a wavelength not longer than 320 nm. A laser rod 13 as the laser medium is accommodated in the first cooling pipe 11, and a flash lamp 14 as the excitation lamp is accommodated in the second cooling pipe 12. The laser rod 13 is formed of Nd:YAG (neodymium-added yttrium-aluminum-garnet), and the flash lamp 14 has an bore diameter of 10 mm and an arc length of 190 mm. The laser rod 13 and the flash lamp 14 are designed to be cooled by a cooling water circulated through communication pipes 15 from the cooling pump 16, respectively.

Figure 4:
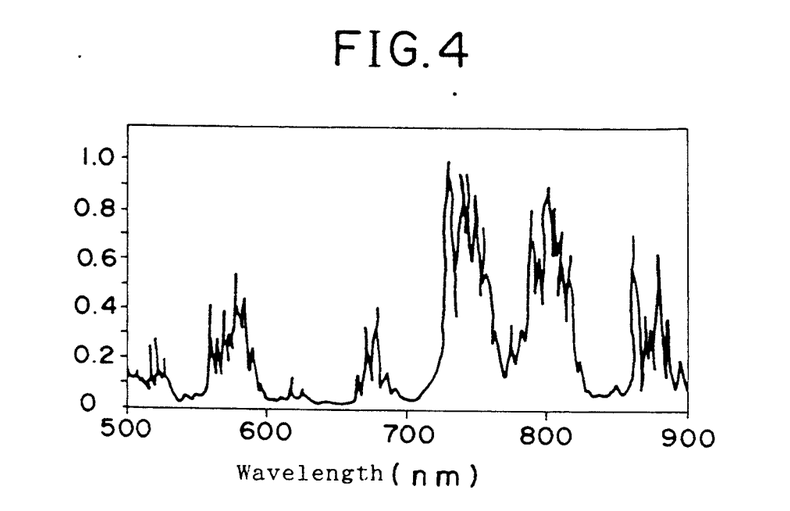
FIG. 4 is a graph showing an absorption spectrum of YAG.
Figure 5:
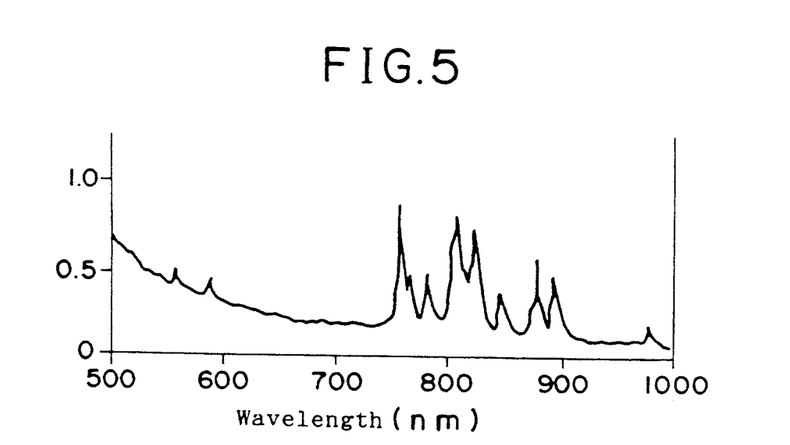
FIG. 5 is a graph showing a spectrum distribution of a krypton flash lamp.
Figure 6:
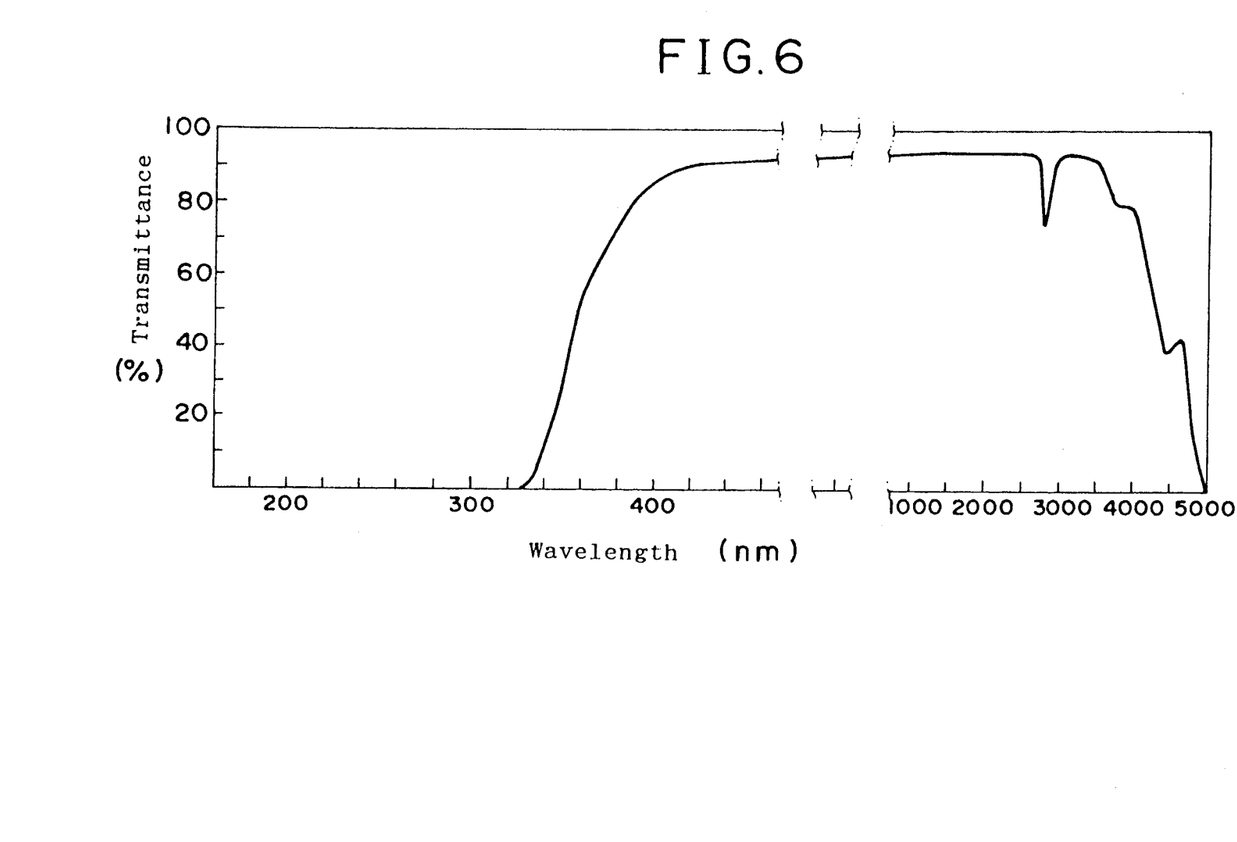
FIG. 6 is a graph showing a light transmittance of cerium doped quartz glass according to the present invention.

FIG. 4 shows an absorption spectrum of Nd:YAG, and FIG. 5 shows a spectrum of the flash lamp 14. FIG. 6 shows a light transmittance of the cerium doped quartz glass according to the present invention. As apparent from FIG. 6, the cerium-doped quartz glass according to the present invention inhibits transmission of light having a wavelength not longer than 320 nm unlike the conventional cerium-doped natural quartz glass shown as the curve D in FIG. 9. As apparent from FIGS. 4 and 5, a light having a wavelength unnecessary for the oscillation of the Nd:YAG laser rod 13 is not applied to the laser rod 13.

The cerium-doped quartz glass to be used in the present invention includes those having a cerium doping rate of, for example, 0.185 wt. %.

An ultraviolet light having a wavelength not longer than 320 nm emitted from the flash lamp 14 is blocked since the wavelength of ultraviolet light ranges from about 1 to 400 nm. Thus, since much of the ultraviolet light applied to the laser medium is blocked the generation of thermal energy in the laser medium can be suppressed to thereby prevent the generation of a thermal lens effect. As a result, expansion of a divergence angle of a laser beam can be suppressed, and a reduction in the oscillation power can be suppressed.

Figure 7:
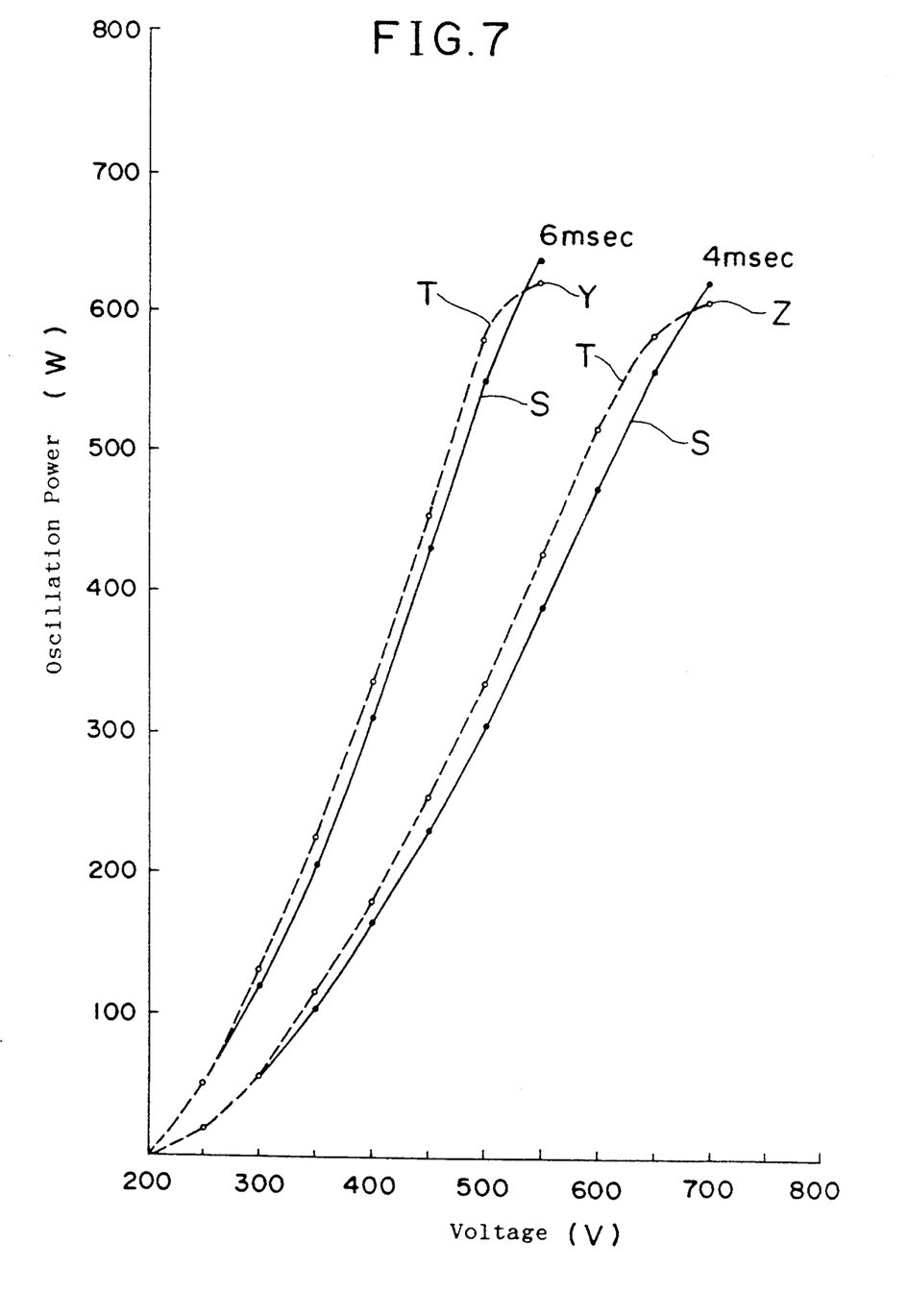
FIG. 7 is a graph showing oscillation powers of the cooling pipes of the present invention and the prior art due to a difference between lamps.

FIG. 7 shows a relation between a voltage applied to the excitation lamp and an oscillation power from the laser medium in using different kinds of the cooling pipes. Regarding the cooling pipes, which were used in the first and second embodiments according to the present invention, and the cooling pipes T in the prior art, the oscillation power in case of the cooling pipes T decreases at the points Y and Z with an increase in the voltage, which that in case of the cooling pipes S, hardly decreases with an increase in the voltage.

FIG. 8 shows a relation between an oscillation power from the laser medium and a divergence angle of the laser beam in using the cooling pipes S according to the present invention and the cooling pipes T in the prior art, in which expansion of the divergence angle at an increased oscillation power in case of the cooling pipes S is less than that in case of the cooling pipes T.

Thus, the irradiation of ultraviolet light from the excitation lamp 14 into the first cooling pipe 11 can be suppressed to thereby prevent the generation of thermal energy in the laser medium. Therefore, the expansion of the divergence angle of the laser beam can be suppressed, and the reduction in oscillation power can also be suppressed.

INDUSTRIAL APPLICABILITY

Said solid-state laser device, in which the cooling system of the laser medium and the cooling system of the excitation lamp are independent of each other and are provided respectively with the pump for feeding the cooling water, can absorb sufficiently a pressure loss to circulate the cooling water at a proper flow rate. As a result, a sufficiently large electric power can be applied to the excitation lamp without breakage of the laser medium, and a large oscillation power can be obtained.

Accordingly, the laser device may be usefully applied to welding or cutting of a high-reflectivity material or a thick member, which require a large laser power.

Furthermore, said laser device, in which the cooling pipes are formed of cerium-doped quartz glass capable of inhibiting transmission of a light having a wavelength not longer than 320 nm can suppress the irradiation of ultraviolet light from the excitation lamp to the laser medium to thereby prevent the generation of thermal energy in the laser medium. Therefore, the expansion of a divergence angle of a laser beam can be suppressed, and a reduction in oscillation power can be suppressed.

Consequently, an excitation efficiency in the laser medium can be improved, and a stable laser oscillation can be effected.

We claim:

1. A solid-state laser device comprising a laser medium, an excitation lamp for applying an excitation light to said laser medium, a transparent first cooling pipe accommodating said laser medium, a transparent second cooling pipe accommodating said excitation lamp, wherein a first cooling system which feeds a cooling water to said first cooling pipe and a second cooling system which feeds a cooling water to said second cooling pipe are independent of each other and the respective systems have a water-feeding pump.

2. The solid-state laser device according to claim 1, wherein a flow rate of said cooling water in said first cooling system is maintained at 30 liters/min or more, and a flow rate of said cooling water in said second cooling system is maintained at 60 liters/min or more.

3. A solid-state laser device comprising a laser medium, an excitation lamp for applying an excitation light to said laser medium, and a transparent first cooling pipe accommodating said laser medium, a transparent second cooling pipe accommodating said excitation lamp, said device being designed to feed a cooling water to said cooling pipes, wherein at least one of said first cooling pipe and said second cooling pipe is formed of cerium-doped quartz glass capable of inhibiting transmission of a light having a wavelength not longer than 320 nm.

4. The solid-state laser device according to claim 3, wherein a first cooling system which feeds the cooling water to said first cooling pipe and a second cooling system which feeds the cooling water to said second cooling pipe are independent of each other and the respective systems have a water-feeding pump.

5. A solid-state laser device comprising a laser medium, an excitation lamp for applying an excitation light to said laser medium, a transparent first cooling pipe accommodating said laser medium and a transparent second cooling pipe accommodating said excitation lamp, wherein at least one of said first cooling pipe and said second cooling pipe is formed of cerium-doped quartz glass capable of inhibiting transmission of a light having a wavelength not longer than 320 nm, and wherein a first cooling system which feeds a cooling water to said first cooling pipe and a second cooling system which feeds a cooling water to said second cooling pipe are independent of each other and the respective cooling systems each have a separate water-feeding pump.

6. The solid-state laser device according to claim 5, wherein a flow rate of said cooling water in said first cooling system is maintained at 30 liters/min or more, and a flow rate of said cooling water in said second cooling system is maintained at 60 liters/min or more.

* * * * *